Jan. 28, 1936.  H. F. VICKERS  2,028,850
MACHINE TOOL FEED
Original Filed May 19, 1930  2 Sheets-Sheet 2

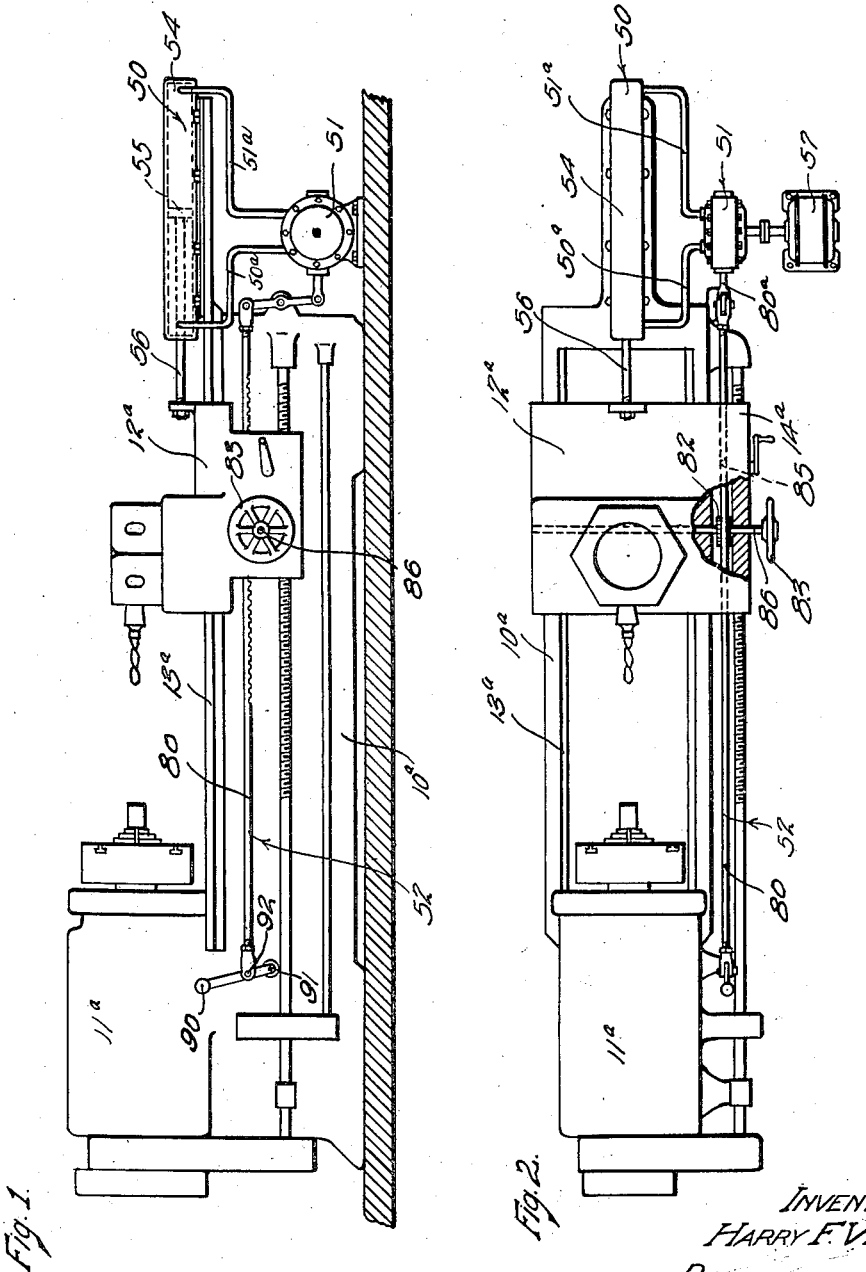

INVENTOR
HARRY F. VICKERS
BY
HIS ATTORNEY

Patented Jan. 28, 1936

2,028,850

UNITED STATES PATENT OFFICE 2,028,850

MACHINE TOOL FEED

Harry F. Vickers, Detroit, Mich.

Application May 19, 1930, Serial No. 453,848
Renewed December 6, 1935

6 Claims. (Cl. 60—52)

This invention relates to a machine tool feed and has particular reference to a feed mechanism or system particularly suited for operating the carriage or movable element of a lathe, milling machine, or other like mechanism.

Throughout the following detailed description I will refer to the invention as applied to the operation of a lathe carriage, it being understood that the broader principles of the invention are not to be thereby construed as limited either as to construction or range of application.

It is an object of the present invention to provide a feed for the movable element of a machine, or the like, in which a variable pump is directly connected with a cylinder and piston means for actuating the movable element, the pump being under manual control.

It is a further object of this invention to provide a feed of the character mentioned in which there is a fluid pressure actuated mechanism for operating the carriage, a variable and reversible pump operatively connected with said mechanism, and an improved manual control means directly operatively connected with the pump.

Figure 3:
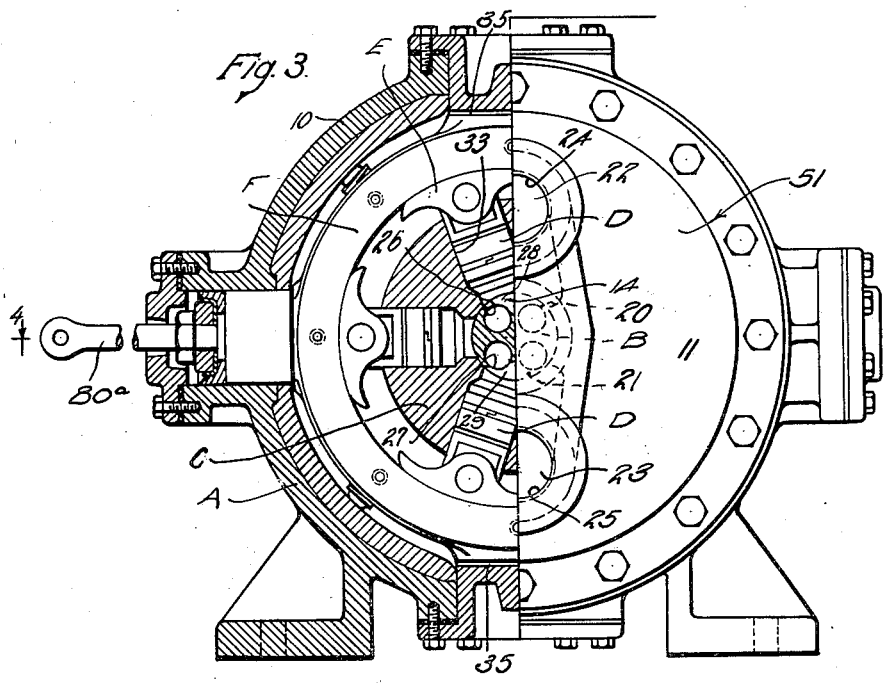
Figure 4:
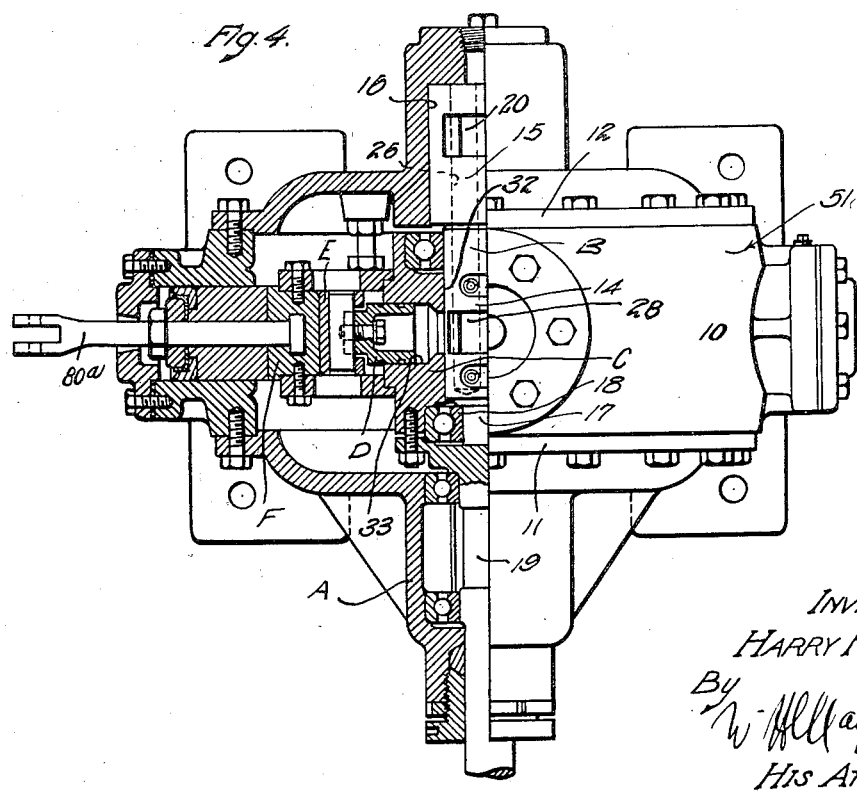

The various objects and features of my invention will be best and more fully understood from the following detailed description of a typical preferred form and application of the invention, throughout which description reference is had to the accompanying drawings, in which:

Fig. 1 is a front elevation of a typical lathe showing the present invention applied thereto for the operation of the carriage. Fig. 2 is a plan view of the parts shown in Fig. 1. Fig. 3 is a side view of the pump employed in carrying out the invention, one half of the mechanism being shown in section, and Fig. 4 is a plan view taken as indicated by line 4—4 on Fig. 3 showing one half of the mechanism in section.

The feed provided by this invention may be applied to or carried out in various machines. It is particularly suited for use in machine tools such as milling machines, lathes, etc., and therefore I have chosen to disclose it as applied to a typical lathe construction.

The lathe illustrated in the drawings includes, generally, a bed $10^a$, a head $11^a$ at one end of the bed $10^a$, and a carriage $12^a$ movable longitudinally of the bed. The bed $10^a$ of the lathe has ways $13^a$ which slidably carry the carriage $12^a$. In accordance with standard lathe construction the carriage $12^a$ is provided with an apron $14^a$ which extends downwardly at the front of the bed. The bed carries the various controls for the carriage. The present invention is applied to move the carriage longitudinally and therefore the various other controls ordinarily employed in a lathe have been eliminated from the disclosure.

The present invention provides, generally, a cylinder and piston mechanism 50 operable to actuate the carriage $12^a$ along the ways $13^a$, a variable reversible pump 51 for supplying an actuating fluid to the mechanism 50, and a manual control means 52 for the pump.

In the particular arrangement illustrated the cylinder and piston mechanism 50 is arranged at the outer end of the lathe bed $10^a$ parallel with the ways $13^a$ and includes, generally, a cylinder 54 attached to the lathe bed, a piston 55 operable in the cylinder and a piston rod 56 connecting the piston with the lathe carriage. With this arrangement operation of the piston 55 longitudinally in the cylinder 54 causes corresponding movement of the carriage longitudinally on the ways $13^a$.

The pump 51 provided by the present invention may be any suitable variable pump operable by a motor 57 or other source of power to deliver fluid under pressure to the mechanism 50 for moving the piston 55 longitudinally in the cylinder. In the drawings I have disclosed one form of pump that may be employed in carrying out the invention and I will describe the construction and operation of this pump generally.

The pump includes, generally, a casing A, a hub B in the casing, a cylinder block C arranged in the casing to revolve about the hub, a plurality of pistons D operating in the cylinders of the block C, shoes E on the outer ends of the pistons D to operate in a ring F within the housing, and various other parts incidental to those mentioned.

The housing A has a cylindrical center section 10 and end plates 11 and 12 closing the ends of the center section. The hub B is mounted centrally in the casing A and is stationary relative to the casing. The hub B has a middle portion 14 within the casing and on which the cylinder block C rotates. Adjoining one end of the part 14 is an enlarged end part 15 which is supported in a socket 16 provided in the end plate 12 of the casing. Adjoining the other end of the middle part 14 is a reduced end part 17 supported by a bearing 18 carried by a shaft 19 which extends into the casing through the end plate 11. The enlarged end part 15 is fixed in the socket 16 so that it is stationary relative to the casing and has diametrically opposite ports 20 and 21 communicating with ports 22 and 23, respectively, in the end plate 11 of the casing. The ports 22 and 23 terminate in openings 24 and 25, respectively, connected with opposite ends of the cylinder 54 by suitable conduits 50ª and 51ª. The ports 20 and 21 communicate with passages 26 and 27, respectively, which extend longitudinally through the hub to the middle part 14. The passages 26 and 27 communicate with diametrically opposite ports 28 and 29, respectively, which cooperate with the cylinder openings in the cylinder block C. The passages 26 and 27 connect the passages 28 and 29 with the ports 20 and 21.

The cylinder block C is arranged in the casing A and has a central bore 32 fitting the middle part 14 of the hub. A plurality of cylinders 33 are formed radially in the block C to carry the pistons D. The pistons D project outwardly from the block C and carry the shoes E which operate in the ring F. The ring F is mounted in the casing A through slides 35 so that it can be shifted in either direction from a position where it is concentric with the hub. When the ring is shifted in either direction from the concentric position it becomes eccentric to the hub, and when eccentric to the hub the shoes cooperate with the ring to cause movement of the pistons in the cylinders. By moving the ring in one direction from the concentric position fluid is circulated through the mechanism in one direction while upon moving the ring in the opposite direction from the concentric position fluid is circulated in the opposite direction through the mechanism. By varying the extent of eccentricity the stroke of the pistons and therefore the capacity of the pump is varied.

With the motor 57 operating constantly, the ring F can be positioned centrally relative to the hub so that there is no flow of fluid through the mechanism or the ring can be moved in either direction from the central position causing the fluid to circulate in the desired direction, that is, to either end of the cylinder 54.

The control means 52 provided by the present invention includes, generally, a rack 80 arranged longitudinally of the lathe bed 10ª, a pinion 82 carried by the carriage 12ª and meshing with the rack, and a hand wheel 83 for operating the pinion. The rack 80, in accordance with the present invention, is positively connected to the ring F of the pump. In the construction illustrated a connecting rod 80ª directly connects the ring F with the rack 80.

The rack 80 extends longitudinally of the lathe bed parallel with the ways 13ª, and is located at the front of the bed in the manner illustrated throughout the drawings. The rack is adapted to be moved longitudinally relative to the lathe bed in order to effect movement, and therefore operation of the ring F of the pump. In the case illustrated the rack is shown slidably supported on a guideway 85 provided on the lathe bed 10ª.

The pinion 82 is carried on a shaft 86 mounted in the apron 14ª of the lathe so that it meshes with the rack 80. The shaft 86 projects from the front of the carriage where it carries the hand wheel 83. With this arrangement of parts turning of the hand wheel causes operation of the pinion which, being meshed with the rack 80, causes movement of the rack, the direction of movement of the rack depending upon the direction in which the hand wheel is operated. When the pinion 82 is turned through the hand wheel 83 so that the rack 80 is operated to move the ring F out of the neutral or central position, fluid is pumped to one end of the cylinder 54 causing operation of the piston 55 in the cylinder so that the carriage 12ª is moved along the ways 13ª. When the operator stops turning the hand wheel, he may hold it against turning and as soon as operation of the pinion ceases the movement of the lathe carriage 12ª which supports the pinion causes the pinion to cooperate with the rack so that the rack is returned to the neutral position or to the position where the ring F is central, whereupon further operation of the mechanism immediately ceases. It will be obvious that the direction of operation of the carriage depends upon the direction in which the rack is operated by means of the pinion 82 and that the mechanism automatically stops or returns to the neutral position upon the pinion stopping operation after having been operated in either direction.

For the purpose of providing for continuous operation of the lathe carriage in either direction without operating the hand wheel 83, for instance, for operating the carriage rapidly in one direction or the other, a hand lever 90 is pivotally connected to a stationary part of the lathe at 91 and is connected with the rack at a point 92 removed from the point 91. Through the lever 90 the rack may be moved in either direction independently of the hand wheel and the pinion 82 thus operating the ring F in either direction to cause the desired operation of the carriage 12ª.

From the foregoing description it will be apparent that I have by my present invention provided an effective, practical feed for a lathe carriage, or the like, in which the carriage is directly operated by a variable pump, the pump being under direct manual control.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. In a machine tool, a stationary frame, a movable carriage on the frame, a cylinder and piston mechanism for operating the carriage on the frame, a variable reversible pump for supplying operating fluid to said mechanism, the pump including a rotating cylinder and piston assembly, and ring surrounding the said assembly and cooperating with the pistons of said assembly, the ring being shiftable to vary the stroke of the pistons and to change the direction of flow through the pump, and means controlling operation of the pump, including a shiftable actuating member mechanically connected with said rings, control means engaging said actuating member to operate it, the control means being carried by the movable carriage, and means whereby said control means may be manually operated and held stationary.

2. In a machine tool, a stationary frame, a movable carriage on the frame, a cylinder and piston mechanism for operating the carriage on the frame, a variable reversible pump for supplying operating fluid to said mechanism, the pump including a rotating cylinder and piston assembly, a ring surrounding said assembly and cooperating with its pistons, and means slidably supporting the ring for movement in opposite directions from a position concentric with the rotating assembly whereby the direction of flow through the pump may be reversed and the strokes of the pistons varied, and means for controlling operation of the pump including an actuating member, a control means engaging the actuating member to operate it, the control means being carried by the movable carriage and means whereby the control means may be manually operated and held stationary.

3. In a machine tool, a stationary frame, a movable carriage on the frame, a cylinder and piston mechanism for operating the carriage on the frame, a variable reversible pump for supplying operating fluid to said mechanism the pump including a control element operable to reverse the pump and vary the capacity of the pump, and means for varying the pump including an actuating member mechanically connected with said control element of the pump, control means engaging the actuating member to operate said member, the control means being carried by the movable carriage and means whereby the control means may be operated and whereby said control means may be held stationary so that movement of the carriage subsequent to the stopping of the control means causes movement of the actuating means through co-operation with the control means which results in a shifting of the control element of the pump to its neutral position.

4. In a machine tool, a stationary frame, a movable carriage on the frame, a cylinder and piston mechanism for operating the carriage relative to the frame, a variable reversible pump for supplying operating fluid to said mechanism, the pump including a control element operable to reverse the pump and to vary the capacity of the pump, and means for varying the pump including an actuating member shiftably mounted relative to the frame and mechanically connected with the control element of the pump, control means engaging the actuating member to operate the control element of the pump, said control means carried by the movable carriage and means whereby the control means may be operated or held stationary so that movement of the carriage subsequent to stopping of the control means causes movement of the actuating member through cooperation with said control means which results in a shifting of the control element of the pump to its neutral position.

5. In a machine tool, the combination of a frame, a movable member supported thereby, a fluid pressure actuated motor for moving said member, a variable displacement pump including means for controlling the flow of actuating fluid to and from said motor, a control member connected to said pump control means and having movement independent thereof and also a movement therewith, and means operatively connecting said movable member and said control member for controlling said pump control means to move said movable member in predetermined relation to the independent movement of said control member.

6. In a machine tool, the combination of a frame, a movable member supported thereby, a fluid pressure actuated motor for moving said member, a variable displacement and reversible flow pump for supplying operating fluid to said motor, the pump including a control element operable to reverse the pump and to vary the capacity of the pump, a control member carried by said movable member and connected to said pump control element and having movement independent thereof and also movement therewith, a manually operating lever mounted on the frame and operatively connected to said pump control element, and means operatively connecting said movable member and said control member for controlling said pump control element to move said movable member in predetermined relation to the independent movement of said control member.

HARRY F. VICKERS.